United States Patent [19]

Kong

[11] Patent Number: 5,047,225

[45] Date of Patent: Sep. 10, 1991

[54] LOW DENSITY CARBONIZED COMPOSITE FOAMS

[75] Inventor: Fung-Ming Kong, Pleasanton, Calif.

[73] Assignee: The United States of America as represented by the United States Department of Energy, Washington, D.C.

[21] Appl. No.: 493,534

[22] Filed: Mar. 14, 1990

Related U.S. Application Data

[62] Division of Ser. No. 447,478, Dec. 7, 1989, Pat. No. 4,992,254.

[51] Int. Cl.$^5$ ........................ D01F 9/12; G21C 15/00; G21C 13/00
[52] U.S. Cl. .............................. 423/447.2; 264/29.1; 521/61; 521/64; 521/136; 521/139; 376/362; 376/461
[58] Field of Search ..................... 423/447.2; 264/29.1; 376/362, 461; 521/61, 64, 136, 139

[56] References Cited

U.S. PATENT DOCUMENTS

| | | | |
|---|---|---|---|
| 3,577,363 | 5/1971 | Klug | 260/2.5 |
| 4,276,246 | 6/1981 | Bonzom et al. | 264/53 |
| 4,775,655 | 10/1988 | Edwards et al. | 502/416 |
| 4,806,290 | 2/1989 | Hopper et al. | 423/449 |
| 4,832,881 | 5/1989 | Arnold, Jr. | 423/449 |

FOREIGN PATENT DOCUMENTS 0060138 9/1982 European Pat. Off.

OTHER PUBLICATIONS

Direct Drive Cryogenic ICF Capsules Employing D-T Wetted Foam by R. A. Sacks, D. H. Darling, Nuclear Fusion, vol. 27, No. 3 (1987).
Low Surface Energy Polymers and Surface-Active Block Polymers by M. H. Litt, B. R. Hsieh, I. M. Krieger, T. T. Chen, H. L. Lu, Journal of Colloid and Interface Science, vol. 115, No. 2, Feb. 1987.
Low-Density Carbonized Composite Foams for Direct-Drive Laser ICF Targets by Fung-Ming Kong, Lawrence Livermore National Laboratory, UCRL-100798, Mar. 1989.
Summary Abstract: Characterization of Low-Density Foam Materials for Direct-Drive Laser Inertial Confinement Fusion Targets, Letts et al., J. Vac. Sci. Technol. A 6(3), May/Jun. 1988.

*Primary Examiner*—Morton Foelak
*Attorney, Agent, or Firm*—Henry P. Sartorio; L. E. Carnahan; William R. Moser

[57] ABSTRACT

A carbonized composite foam having a density less than about 50 mg/cm$^3$ and individual cell sizes no greater than about 1 μm in diameter is described, and the process of making it.

7 Claims, 2 Drawing Sheets

LOW DENSITY CARBONIZED COMPOSITE FOAMS

The United States Government has rights in this invention pursuant to Contract No. W-7405-ENG-48 between the U.S. Department of Energy and the University of California for the operation of the Lawrence Livermore National Laboratory.

This is a division of application Ser. No. 07/447,478 filed Dec. 7, 1989 now U.S. Pat. No. 4,992,254.

FIELD OF THE INVENTION

This invention relates to low density carbonized composite foams, and to a process for making them. More particularly, it relates to low density carbonized polymer foams having improved structural integrity and low thermal contraction. These foams are suitable for use in a variety of applications including controlled nuclear fusion and as structural supports.

BACKGROUND OF THE INVENTION

The process that generates the sun's energy is sustained nuclear fusion. Replicating this process in a controlled environment would yield an inexhaustible supply of energy, a commodity which is in short supply presently. For example, at the present rate of consumption, it is estimated that the world supply of oil will be exhausted within 100 years or less.

There is presently underway in the United States, and probably foreign countries, research efforts directed to processes for creating energy by controlled sustained nuclear fusion. It has been suggested that one way to achieve such nuclear fusion is to bombard a hydrocarbon foam target, or capsule, usually containing a deuterium-tritium (DT) fuel mixture, with a laser beam. The laser beam, at sufficiently high energy level, would cause a plasma envelope to form on the surface of the fuel mixture which would drive the capsule inward (imploding) to heat the fuel. Under appropriate conditions, the fuel will ignite in a thermonuclear burn, causing the fusion of deuterium and tritium to produce helium and give off energy.

The physics of the laser inertial confinement fusion, as this process is called, imposes several requirements on the design and material characteristics of the fuel and capsule that comprise the target of the laser beam.

By appropriate calculations and experimental efforts, it has been determined that optimum results will be obtained when a dense liquid or solid fuel is contained inside a capsule having near perfect spherical symmetry. The target capsule has a hollow core which provides a DT vapor region to serve as a spark plug when the fuel and vapor is compressed by the implosion.

In addition to the requirements of spherical configuration, it is also required that the capsule containing the fuel be porous, low in density and made with materials having a low atomic number. A capsule made of low density hydrocarbon foam is mostly empty space, and if porous or open celled, will act as a wick, soaking up fuel, thereby providing the maximum amount of fuel to fill the volume of the spherical capsule.

When liquid fuel is charged to the foam capsule, it becomes wet. For a wetted foam capsule, the internal structure must be sufficiently strong and the cells small enough so that capillary forces will support a liquid column about the height of the capsule diameter under the maximum acceleration that the capsule may undergo ($\sim 1000$ g) during injection into a reactor at 1000 mls.

By calculation, it has been determined that each foam cell should be no more than about 1 $\mu$m in diameter, that all cells must be linked to all others by passageways, and that the density of the foam be less than about 50 mg/cm$^3$.

THE PRIOR ART

Foams made from polymeric materials are well known in the art. Foams made from polyurethanes, phenolics, cellulose acetate, and polystyrene are described in *Plastic Foams*, Vol. II, Benning, John Wiley & Sons, 1969.

U.S. Pat. No. 4,276,246 discloses a process for the manufacture of pitch foams, and the subsequent conversion of them to carbon and graphite foams. The pitches may be steam cracking residues, asphaltic pitches, coal tar pitches, and the like. The claimed process consists of carrying out an expansion of the pitch under conditions of pressure and temperature so as to avoid the occlusion of the cavities. The pitch foams are converted to carbon or graphite foams by oxidation followed by carbonization.

U.S. Pat. No. 3,577,363 discloses cellular plastics consisting of closed cells of polystyrene surrounded by cured urea formaldehyde resin. The plastic foams are made by mixing grains of polystyrene in an unexpanded state with a curable urea formaldehyde resin, foaming and curing the urea formaldehyde, then expanding the polystyrene cells by supplying heat while maintaining the total volume of foam unchanged.

The cellular body thus obtained is stated to have excellent heat insulating properties and is fire resistant.

U.S. Pat. No. 4,775,655 relates to porous carbon structures and a process of preparation. The structures are prepared by heating a stabilized, cross-linked porous polymer in an inert atmosphere at a temperature of at least 500° C. The structures are stated to have concave surfaces and at least 80% voids. They also have densities of less than 0.5 g/cm$^3$, and are comprised of cavities jointed by interconnecting pores.

The cross-linked porous polymers used in the process are formed by crosslinking styrene or similar monomers with divinylbenzene.

European Patent Application No. 0,060,138 discloses cross-linked polymeric materials of low density and high absorbency. The polymeric materials are made by preparing a water-in-oil high internal phase emulsion of a monomer, preferably styrene, a cross-linking agent, a free radical initiator and an emulsifying agent, then heating the emulsion until polymerization takes place.

Foams made in accordance with the process described in European Patent Application 0,060,138 have some characteristics which would make them suitable for use in the laser nuclear fusion process described herein. They are, for example, easily wet by liquid DT, and have excellent machinability, thus could be formed into hemishells, a desired shape, easily. The smallest cell diameter, which can be achieved, however, is 2-3 $\mu$m. Thus, the foams are inadequate because foams with cell diameters of no more than about 1 $\mu$m are needed for achieving high-gain nuclear fusion.

The foams of the prior art are inadequate for the use intended. What is needed is a low density foam having good structural integrity, low thermal contraction and cell diameters of about 1 $\mu$m or less.

IN THE DRAWINGS

SUMMARY OF THE INVENTION

Figure 1:
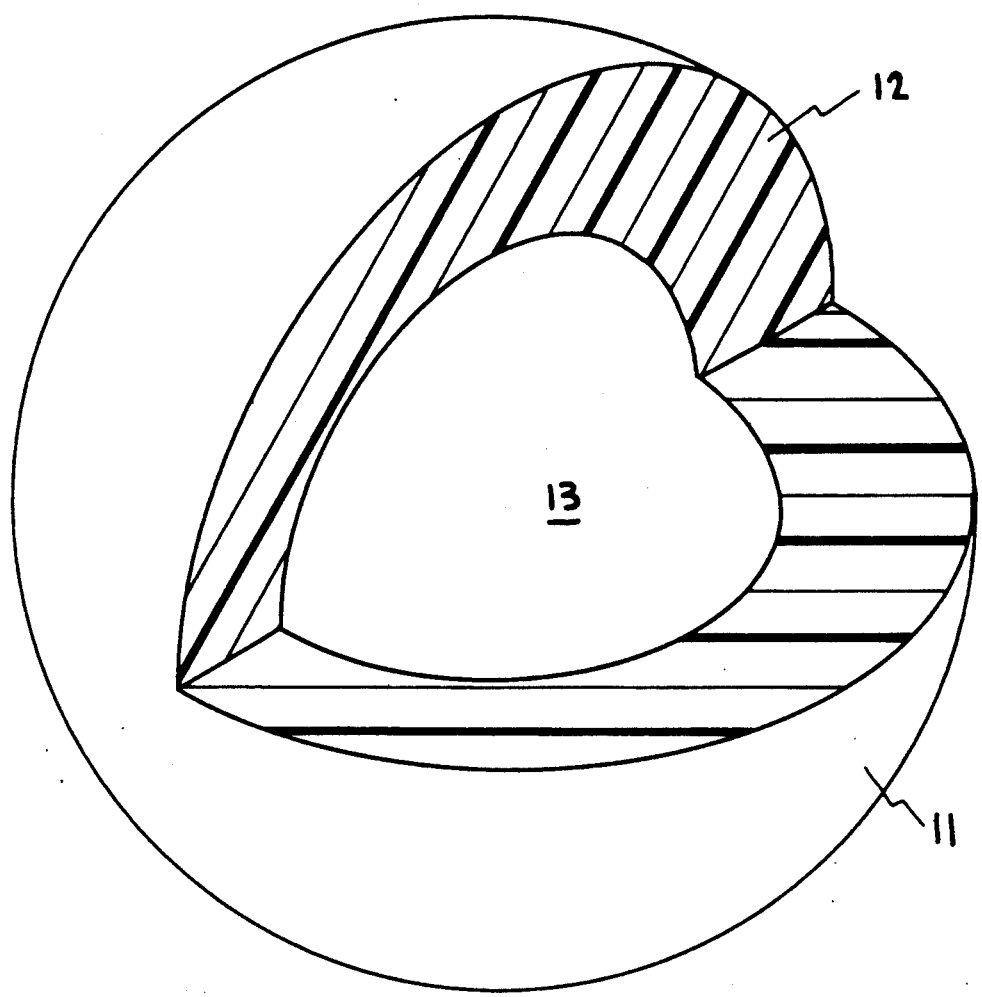
FIG. 1 is a perspective view, with portions cut away, of the fuel capsule of this invention.

It is an object of this invention to provide a spherical fuel container which is suitable for use as a target for a laser beam in a controlled nuclear fusion process.

It is also an object of the present invention to provide a carbonized porous polymeric composite foam material having a density less than about 50 mg/cm$^3$ and individual cells connected by pores in which the individual cells have diameters of about 1 $\mu$m.

It is a further object of the invention to provide a process for making the above described foam material.

Other objects and advantages of the invention will be apparent from the description to follow.

There are several embodiments of the invention described herein.

In one embodiment, the invention comprises a spherical fuel container consisting of a thin non-porous spherical shell surrounding a low density carbonized polymeric foam material having a spherical shape with a hollow spherical core, wherein the foam has a density less than about 50 mg/cm$^3$ and interconnecting individual cells with diameters no greater than about 1 $\mu$m.

In another embodiment, this invention comprises the foam material forming a part of the fuel container referred to above. The foam material is a low density carbonized polymeric composite foam having a density less than about 50 mg/cm$^3$ with interconnected individual cells having diameters no greater than about 1 $\mu$m.

Yet another embodiment of the invention comprises a process for making the foam material. The process comprises the steps of (A) preparing an inverse emulsion of a non-water soluble foam forming monomer in water;

(B) polymerizing and cross-linking the monomer to produce a first formed foam;

(C) filling the cells of the first formed foam with a set of monomers comprising a phenol-aldehyde solution or a high-carbon-yield prepolymer;

(D) curing the set of monomers to achieve polymerization and cross-linking thereof; and (E) heating the first formed foam to a temperature sufficient to carbonize the foam and the material contained within the cells thereof, thereby producing a composite carbonized foam.

The aforedescribed process produces a foam material which is a composite of two different polymers, which has a density less than 50 mg/cm$^3$ and interconnected cells with cell diameters of no greater than about 1 $\mu$m.

DETAILED DESCRIPTION

The foam material of this invention can be made only by the process described herein. The first step is to prepare an inverse water-in-oil emulsion of a non-water soluble monomer, and cross-linking agent in water.

The emulsion is prepared in two stages. First, an oil phase is prepared by mixing a monomer, cross-linking agent, and oil soluble surfactant in one container. Secondly, a water phase is prepared by mixing water and a free radical initiator in another container. The two phases are then combined and agitated until an emulsion is formed in the manner described below.

Various monomers can be used in making the emulsion including, but not limited to, styrene, butylstyrene, other substituted styrenes, and acrylic monomers such as butyl methacrylate and ethyl methacrylate. The monomer, plus a cross-linking agent, which may also be a monomer, are combined to form a porous polymer foam.

The preferred monomer system is a 50:50 by weight mixture of styrene and divinylbenzene. The preferred polymer is a cross-linked polystyrene containing an equal portion by weight of divinylbenzene. Other suitable polymers can be made from acrylic monomers cross-linked with, for example, allyl methacrylate.

An important consideration is that the monomer and/or cross-linking agent be one which contains no elements with high atomic numbers. This is because a variety of physical effects which increase with atomic number interfere with the fusion process and lower the energy yield in a nuclear fusion reaction. Ideally, material containing only carbon and hydrogen as elemental constituents should be used to produce the foam.

The monomer preferably comprises from about 32.5 to about 47.5 percent by weight of the oil phase, more preferably from about 37.5 to about 42.5 percent, and most preferably about 40 percent.

The cross-linking agent preferably comprises from about 32.5 to about 47.5 percent by weight of the oil phase, more preferably from about 37.5 to about 42.5 percent, and most preferably about 40 percent.

The oil soluble surfactant preferably comprises from about 5 to about 35 percent by weight of the oil phase, more preferably from about 15 to about 25 percent, and most preferably from abut 18 to about 23 percent. The optimum concentration is 20 percent.

In the aqueous phase, water preferably comprises from about 99 to about 99.9 percent by weight of the aqueous phase, and most preferably about 99 percent.

The free radical initiator preferably comprises from about 0.1 to about 1 percent by weight of the aqueous phase, most preferably about 1 percent.

The aqueous phase constitutes from about 83 to 98 percent of the total material, more preferably from about 92 to 95 percent, most preferably about 92 percent.

After the two phases are mixed to form an emulsion, the system is heated for a period of time sufficient to cause the free radical initiator to initiate a polymerization reaction of the monomer and cross-linking agent. When styrene is the monomer, and divinylbenzene the cross-linking agent, the emulsion is preferably heated to 50° C. for 24 hours.

Suitable water-soluble free radical initiators include potassium or sodium persulfate and various redox systems, such as ammonium persulfate together with sodium metabisulfite. Preferred is sodium persulfate.

Monomer soluble initiators which can be used include azobisisobutyronitrile, benzoyl peroxide and di-2-ethyl-hexyl-peroxy dicarbonate.

An amount of free radical initiator is used which is sufficient to initiate the polymerization.

The surfactant used in making the emulsion to be polymerized should have an HLB value of less than 6 and more than 2. Suitable surfactants include nonionics such as sorbitan monooleate, glycerol monooleate, and glycerol monoricinoleate; cationics such as distearyl dimethyl ammonium chloride, and dioleyl dimethyl ammonium chloride; and anionics such as bis-tridecyl sulfosuccinic acid (Na salt). Preferred is sorbitan monooleate. It is manufactured under the trade name Span 80 ®, by ICI Americas, Inc.

The use of a surfactant at levels higher than about 50 percent by weight of the oil phase results in undesirable change in foam structure.

After polymerization is complete and a foam produced, the residual surfactant and free radical initiator and their residues can optionally be removed. The residual surfactant and free radical initiator, and/or decomposition products, are removed by forcing a mixture of isopropanol and water through the foam to dissolve and carry away the contaminants.

The volume ratio of isopropanol to water in the mixture can be varied as desired, as long as there is sufficient water present to remove the water soluble contaminants, and sufficient isopropanol to remove the alcohol soluble contaminants. Most preferred is a ratio of 50:50.

Alternatively, the foam can be flushed sequentially with water alone, then isopropanol, or isopropanol then water.

Other organic solvents such as methanol or ethanol or hexane would be suitable for use instead of isopropanol.

The organic solvent should be one which will not have a deleterious effect on the foam itself.

For uses of the foam other than as a fuel containing target in a nuclear fusion reaction process, the removal of the contaminants might not be necessary.

Foams produced in accordance with the initial steps of the process have densities of 25 to 170 mg/cm$^3$, and cell diameters larger than 2–3 $\mu$m. This, as previously indicated, is unsatisfactory for the intended purpose, inasmuch as cell diameters of about 1 $\mu$m are required.

The next step, after optional removal of the surfactant and free radical initiator contaminants, is to fill the cells of the previously formed foam with an uncured aqueous phenol-aldehyde foam forming solution. This solution is prepared by adding the phenol and aldehyde component to water, along with a catalyst.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p,p'-dihydrexydiphenyl dimethyl methane or hydroxyanthracenes.

The phenols can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, meta-aldehyde, para-aldehyde, acetaldehyde and benzaldehyde.

In general, the phenols and aldehydes which can be used in the process of the invention are those described in U.S. Pat. No. 3,960,761 which is incorporated herein by reference.

The preferred catalyst for use in the phenol-aldehyde solution is sodium carbonate. Any other catalyst can be used, however, which will maintain the solution at a pH of between about 6 and 7. Such catalysts include sodium hydroxide, triethanolamine, and zinc oxide, for example.

In the preferred solution, the solid contents constitute from 1 to 20 weight percent. Using resorcinol and formaldehyde, the ratio by weight of resorcinol to formaldehyde ranges from about 1:1 to about 1:3, preferably 1:2.

The resorcinol to catalyst ratio can range from about 35:1 to about 300:1, preferably 200:1 by weight.

After the first formed foam has been filled with the phenol-aldehyde solution containing the catalyst, the phenol-aldehyde is cured by heating to form a gel in the cells of the existing foam.

Using the preferred resorcinol-formaldehyde (RF) solution, the cure is achieved by heating the foam containing the RF solution to a temperature of 90° C., and maintaining it until cure is complete. This will normally be about three days.

The gel which is formed contains entrapped water. When this water is removed, either by supercritical drying, or carbonization as described more fully below, the gel is converted into a foam having all diameters of the desired dimensions.

Instead of using a phenol-aldehyde resin as the second foam forming material, other high-carbon-yield prepolymers can be used. By the term "high-carbon-yield" is meant a polymer which on pyrolysis is reduced to the essential elements carbon and hydrogen and has more than 50% of the original weight remaining. Such additional high carbon yield prepolymers include acrylonitrile, furfuryl alcohol, and vinyl alcohol, for example. An initiator, such as sodium persulfate, is needed to initiate the polymerization of the prepolymers during foam forming.

After the resorcinol-formaldehyde or other high-carbon-yield prepolymer is cured, one can go directly to the carbonization step set forth below. For minimizing shrinkage and achieving good density uniformity, however, it is desired to dry the foam at this point. Drying can be achieved by what is termed supercritical drying. In supercritical drying the entrapped water of the gel inside the first formed foam is exchanged for an organic solvent, such as isopropyl alcohol or acetone. The foam is then placed in a jacketed pressure vessel where the organic solvent is exchanged for liquified carbon dioxide. After the exchange is complete, the foam is dried at a temperature above the critical point of carbon dioxide. This process takes about two weeks. When the carbon dioxide is removed, there is left a composite foam comprising the first formed foam and a second formed foam occupying the cells of the first formed foam.

The next step is carbonization.

The composite foam is carbonized by placing it in an oven in an inert atmosphere and heating it to a temperature and for a sufficient period of time until carbonization takes place.

Carbonization occurs at temperatures between 500° and 2,000° C. In the preferred embodiment of the invention where the first formed foam is a polystyrene foam, and the second is a resorcinol-formaldehyde, the temperature is preferably from about 700° C. to about 1050° C.

During the carbonization of the composite foam, the first formed foam vaporizes. The second formed foam, i.e., the phenol-aldehyde or high-carbon-yield polymer foam, remains and conforms to the previously existing cellular structure of the first and second formed foam. With a larger decrease in weight than in volume shrinkage, the carbonized composite foams thus always have a lower density than non-carbonized foams. Densities of less than 50 mg/cm$^3$ have been achieved. Cell diameters of less than 1 μm are also achieved.

Several other advantages accrue from this process. For example, foams prepared from resorcinol-formaldehyde do not have sufficient strength to be used for the desired purpose. However, the resultant composite foam has greater strength than a RF foam alone. It is also more heat resistant than a polystyrene foam, and its smaller cell size gives improved wettability and better surface finish.

The composite foam produced in accordance with the process of this invention can be easily machined. It is thus easy to craft it into the desired configuration.

A fuel container which can be used as a target in a laser inertial confinement fusion process made from the composite foam of this invention is shown in FIG. 1. The fuel container 10 comprises a non-porous thin spherical shaped protective membrane 11 or shell surrounding a spherical shaped open celled composite foam mass 12, having a spherical shaped hollow core 13.

The membrane 11 is formed on the outside of the foam mass by dipping or coating the mass 12 with molten polyvinyl alcohol or other thermoplastic polymer, such as polyethylene or polypropylene, and then letting the polymer solidify. The membrane 11 serves to prevent vapor escaping from fuel contained in the foam.

Fuel, in the form of a liquid deuterium-tritium mixture maintained at about 20°K, is inserted into the foam 12, occupying its cells. The hollow core 13 serves as a region to which fuel vapor escapes, serving as a spark plug when compressed by implosion of the fuel caused by a plasma envelope forming on the surface of the fuel mixture on ignition. The container 10 is positioned in the path of a laser beam to ignite, thereby causing a thermo nuclear burn.

The advantages of the process of this invention and the composite foam produced thereby can be seen in the following examples which are intended to be illustrative of the invention, but not limiting thereof.

EXPERIMENTAL PROCEDURES

EXAMPLE 1

An oil phase is prepared by charging a 25 ml beaker with 1.38 g styrene monomer, 1.38 g divinylbenzene, 1.49 g sorbitan monooleate, and mixing the contents.

An aqueous phase is prepared by charging a 250 ml beaker with 20.54 g H$_2$O and 0.205 g sodium persulfate.

Thereafter, the aqueous phase and oil phase are mixed together and an emulsion formed by placing the mixture into a syringe pump device which agitates the mixture. The syringe pump device consists of two syringes jointed together at their delivery tubes to form a single unit. Each of the syringes contains a piston. The aqueous phase is initially placed in one syringe and the oil phase in the other. The two phases are mixed and an emulsion formed by pumping the contents of each syringe back and forth about 200 times through the tube connecting the syringes. The tube is about 2 cm long and has an orifice of about 1 mm. The emulsion which is formed has individual particle sizes of 1–2 μm.

After the emulsion is formed, it is transferred to one of the syringes of the syringe-pump device, and the syringe is heated in a water bath or oven to a temperature of 50° C. The heating is continued for a period of 24 hours during which time the styrene in the emulsion is polymerized and cross-linked, and a foam formed.

Thereafter, 300 ml of a 50:50 by volume mixture of isopropanol and water is forced through the foam using 30 psi N$_2$, followed by an additional 300 ml isopropanol.

The cells of the extracted polystyrene (PS) foam are then filled with a 2 percent resorcinol/formaldehyde (RF) solution which contains resorcinol and formaldehyde monomers, sodium carbonate as the base catalyst, and distilled water. The catalyst concentration is fixed at resorcinol/catalyst weight ratio of 300, the optimum ratio to prevent substantial shrinkage. The filling is achieved by vacuum. After filling, the foam is submerged in RF solution inside a sealed bottle that is heated to 90° C. for 3 days.

The PS/RF composite is supercritically dried in accordance with the procedure previously described. The composite foam is then pyrolyzed in a horizontal tube furnace (Ohio thermal furnace, model #SN11C) under vacuum and inert atmosphere. The furnace is heated from room temperature to 1050° C. in 12 hours and held at 1050° C. for 4 hours in an argon atmosphere. The power is then turned off and the furnace is allowed to cool for 24 hours thereafter, the carbonized foam is removed.

The density of the resultant carbonized foam is 46 mg/cm$^3$ and the cell diameters are <1 μm.

EXAMPLE 2

In this example a comparison is made between the compressive modulus of the carbonized composite foams made by the process of this invention, and other foams. The compressive modulus measurements are by compressing foam samples (1 cm cubes) at a strain rate of 0.1 %/sec using a mechanical testing apparatus (Instron, model #4201). The results are as follows:

TABLE 1

| Foam | Density (mg/cc) | Compressive Modulus (MPa) |
|---|---|---|
| CPR[1] | 21 | 21 |
|  | 50 | 24 |
|  | 100 | 29 |
| PS/RF[2] | 50 | 12 |
|  | 100 | 19 |
| PS[3] | 50 | 10 |
|  | 100 | 20 |
| CRF[4] | 50 | 3 |
|  | 100 | 6 |

[1]CPR: A carbonized polystyrene/resorcinol-formaldehyde foam.
[2]PS/RS: A non-carbonized polystyrene/resorcinol-formaldehyde foam.
[3]PS: A polystyrene foam made by polymerizing styrene and divinylbenzene.
[4]CRF: A carbonized resorcinol-formaldehyde foam made by polymerizing resorcinol and formaldehyde, followed by carbonization at 1050° C.

EXAMPLE 3

In this example, the thermal behavior of foam materials at 20° K is measured. This is an important measurement because foams which are prepared at room temperature are cooled to approximately 20° K for filling with liquid deuterium-tritium. Thus, it is important to know what the characteristics of these foams are at low temperatures.

The characterization is done with an existing thermal mechanical analyzer that is designed to operate from 90 to 400K. The sample is held in a quartz fixture that transmits changes in sample length to a linear variable differential transformer (LVDT). An adjustable force is applied to the sample through an electromagnet. Modifications to the system included extending the low temperature range to 15 K, which is done by building a new cryostat with simultaneous feedback control of both the cryogen flow and the cryostat heater. The sensitivity of the length-sensing transducer is improved by substituting an eddy-current transducer for the LVDT. The new transducer has a sensitivity of 1 $\mu$m.

Length changes are recorded on a chart recorder as well as on a computer, which also controls the cryogen flow. The apparatus can be operated in two different modes: a static length measurement vs temperature, or as dynamic mechanical spectroscopy. In the static length measurement mode, a constant load is applied to the sample and the length is recorded as a function of temperature. In the dynamic mode, a varying force, either square wave or sinusoidal, is applied to the sample in the frequency range of 0.05 to 20 $s^{-1}$, and the change in length is recorded as a function of temperature. In this mode, changes in the elastic modulus of the foam can be determined throughout the temperature range of the apparatus.

The foams are prepared by vibratoming them into rectangular prisms with dimensions of 5 by 5 by 7.5 mm. The foams tested are set forth in Table II, below.

TABLE II

| Foam** | Thermal Contractions* Thermal Contraction at 20 K. |
|---|---|
| CPR | +0.02% |
| PS/RF | −1.00% |
| PS | −1.40% |
| CRF | +0.20% |

*Thermal contractions measure the fractional dimensional change as a function of temperature.
**The foams tested are the same as in Example 2.

From the foregoing examples, 2 and 3, it is seen that the carbonized polystyrene resorcinol-formaldehyde (CPR) foams produced in accordance with the process of the invention have lower densities, higher compressive modulus, and less thermal change at 20°K than do the foams with which they are compared.

Figure 2:
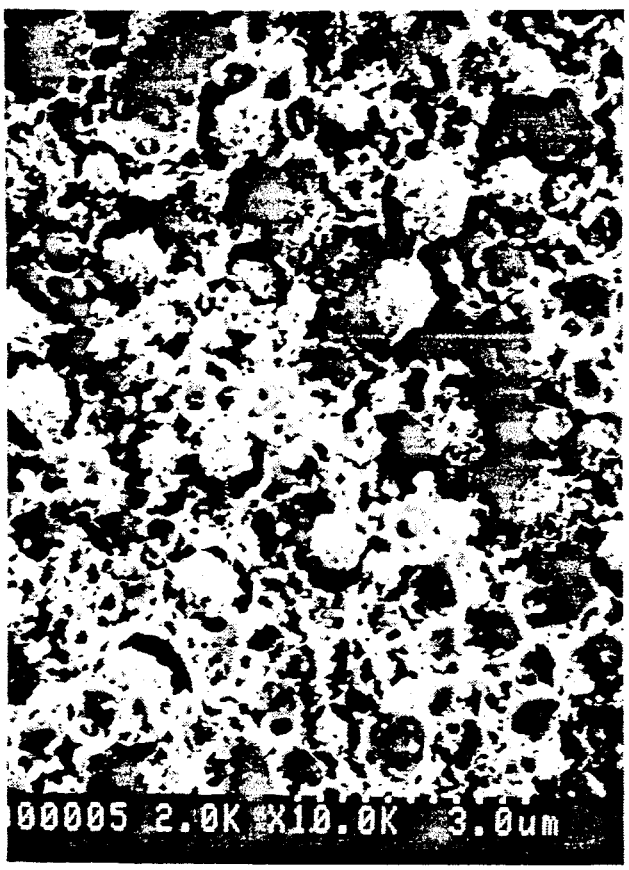
FIG. 2 is a micrograph of foam material produced in accordance with the process of the invention prior to carbonization.
Figure 3:
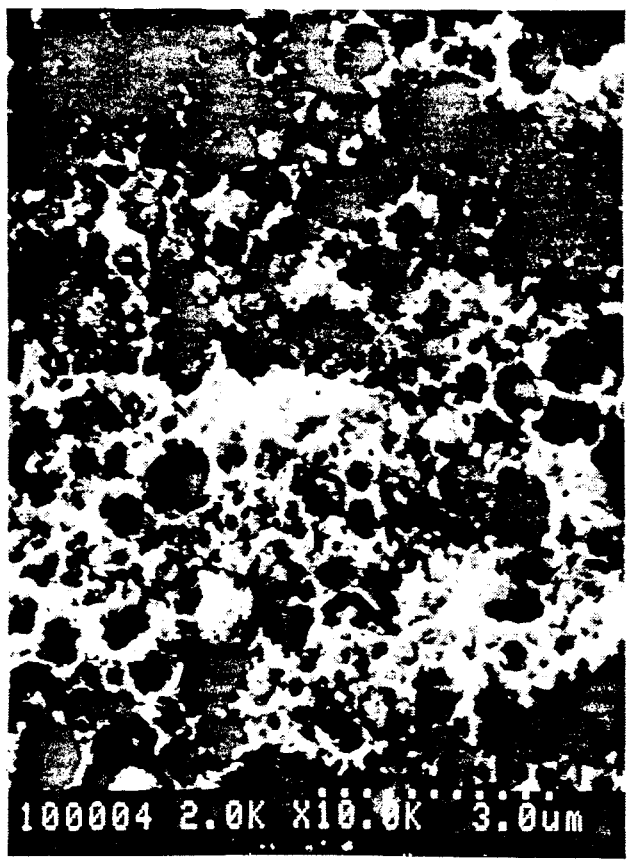
FIG. 3 is a micrograph of foam material produced in accordance with the process of the invention after carbonization.

FIG. 2 is a micrograph illustrating the cellular structure of a polystyrene/resorcinolformaldehyde composite foam prepared in accordance with the process of the invention prior to the carbonization step, while FIG. 3 illustrates the same structure after the carbonization step. As can be seen, the structure of the foam remains intact after the carbonization step.

The foams of this invention are particularly useful as laser targets in controlled fusion reactions, but they can also be used in chromatographic columns, high-temperature catalytic support, and especially for structural support where high strength/weight ratios may be needed.

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. A low density carbonized polystyrene-resorcinol-formaldehyde composite foam prepared by a process comprising:
   (A) preparing an inverse emulsion of a styrene monomer in water:
   (B) polymerizing said styrene monomer to produce a foam;
   (C) filling said foam with an aqueous resorcinol-formaldehyde solution in an amount sufficent to substantially occupy the cells of said foam;
   (D) curing said resorcinol-formaldehyde in said solution to form a gel; and
   (E) heating said resorcinol-formaldehyde gel filled polystyrene foam to a temperature sufficient to carbonize said foam, whereby a foam having a density less than about 50 mg/cm$^3$ and interlinked cells of a diameter no greater than about 1 $\mu$m is produced.

2. The composite foam of claim 1 wherein said resorcinol-formaldehyde solution comprises a mixture of resorcinol and formaldehyde in about a 1:2 molar ratio in aqueous sodium carbonate.

3. The composite foam of claim 2 wherein the resorcinol to carbonate ratio by weight ranges from 35 to 300, and said sodium carbonate is present in an amount sufficient to provide a solution pH ranging from about 6 to about 7.

4. The composite foam of claim 1 wherein said styrene monomer is polymerized in step (B) by heating said emulsion to a temperature of about 50° C.

5. The composite foam of claim 1 wherein said resorcinol-formaldehyde solution is cured in step (D) at a temperature of about 90° C.

6. The composite foam of claim 1 wherein said resorcinol-formaldehyde gel filled polystyrene foam is heated to a temperature of at least about 1050° C.

7. A carbonized composite foam having a density less than about 50 mg/cm$^3$ and individual cell sizes no greater than about 1 $\mu$m in diameter prepared by:
   (A) polymerizing an inverse emulsion of styrene monomers, thereby producing a foam having uniform size cells;
   (B) filling the cells of said foam with a resorcinol-formaldehyde solution;
   (C) curing said resorcinol-formaldehyde solution thereby forming a gel; and
   (D) heating said foam to a temperature sufficiently high to carbonize it.

* * * * *